US012799960B2

(12) United States Patent
Patterson et al.

(10) Patent No.: US 12,799,960 B2
(45) Date of Patent: Nov. 17, 2026

(54) T-BAYONET JOINT

(71) Applicants: GM Global Technology Operations LLC, Detroit, MI (US); Magna Exteriors Inc., Concord (CA)

(72) Inventors: Matthew C. Patterson, Sterling Heights, MI (US); Kenneth G. Bugenski, Macomb, MI (US); Mark A. Sellers, Lennon, MI (US); Darrel Vassallo, Berkley, MI (US)

(73) Assignees: Magna Exteriors Inc., Aurora (CA); GM Global Technology Operations LLC, Detroit, MI (US)

( * ) Notice: Subject to any disclaimer, the term of this patent is extended or adjusted under 35 U.S.C. 154(b) by 1017 days.

(21) Appl. No.: 17/919,701

(22) PCT Filed: Jun. 7, 2021

(86) PCT No.: PCT/US2021/036178
§ 371 (c)(1),
(2) Date: Oct. 18, 2022

(87) PCT Pub. No.: WO2022/031364
PCT Pub. Date: Feb. 10, 2022

(65) Prior Publication Data
US 2023/0142918 A1 May 11, 2023

Related U.S. Application Data

(60) Provisional application No. 63/062,864, filed on Aug. 7, 2020.

(51) Int. Cl.
*B60R 13/04* (2006.01)
*F16B 5/00* (2006.01)

(52) U.S. Cl.
CPC ............ *F16B 5/0024* (2013.01); *B60R 13/04* (2013.01)

(58) Field of Classification Search
None
See application file for complete search history.

(56) References Cited

U.S. PATENT DOCUMENTS 7,354,102 B2 * 4/2008 Cave .................. B60R 13/0206 296/1.08
8,161,706 B2 * 4/2012 Gingras ............. E04B 1/34321 52/582.1

(Continued)

FOREIGN PATENT DOCUMENTS

CN 204472714 U 7/2015
CN 207772843 U 8/2018

(Continued)

OTHER PUBLICATIONS

English Translation of First Office Action Search Report for China Application No. CN202180044490.3 dated May 30, 2025, 2-pages.

(Continued)

*Primary Examiner* — Aaron L Lembo

(57) ABSTRACT

A flange connector assembly for connecting trim pieces of a vehicle. A first male portion having an end portion connected to a first trim part and a second female portion connected to a trim part end to be attached to the first trim part. The first male portion has a connection portion with a T-shaped cross section and the second portion has a second connecting portion with a T-shaped cavity. The first male connecting portion and the second female connecting portion fit to precisely engage each other and retain the trim portion to be attached. The protruding T-shaped portion includes raised tuning flanges and is capable of adjusting up/down, inboard/ outboard or twist fine tuning for providing alignment adjustment to the trim pieces via adjustment of the flange heights (Continued)

in the mold and providing new precisely adjusted T-flanges for providing a tuned butt connection of a trim strip for instance.

22 Claims, 4 Drawing Sheets

(56) References Cited

U.S. PATENT DOCUMENTS

| | | | | |
|---|---|---|---|---|
| 8,776,475 | B2 * | 7/2014 | Williamson | B60R 13/04<br>52/716.5 |
| 10,343,625 | B2 | 7/2019 | Grunert | |
| 11,932,176 | B2 * | 3/2024 | Esper | B60R 13/0206 |
| 2011/0099912 | A1 | 5/2011 | Ohtake et al. | |
| 2015/0375799 | A1 | 12/2015 | Morris et al. | |
| 2018/0086287 | A1 | 3/2018 | Grunert | |
| 2022/0041119 | A1 * | 2/2022 | Esper | B60R 13/0206 |

FOREIGN PATENT DOCUMENTS

| | | | |
|---|---|---|---|
| DE | 4416972 | A1 | 11/1995 |
| EP | 0999321 | A2 | 5/2000 |

OTHER PUBLICATIONS

International Search Report for PCT/US2021/036178 mailed Sep. 29, 2021, 1-page.
CN Office Action for CN Application No. 202180044490.3 dated Jan. 22, 2026 (13 pages).
CA Office Action for CA Application No. 3181290 dated Apr. 28, 2026 (6 pages).

* cited by examiner

FIG. 7
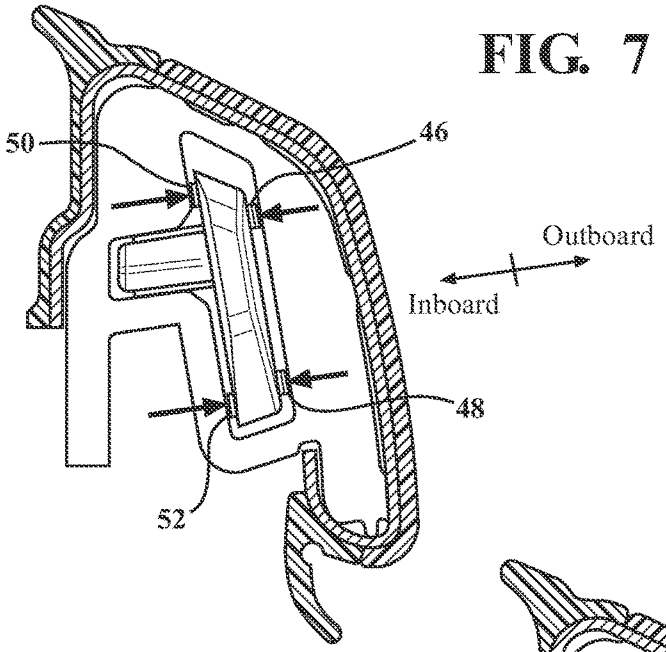
FIG. 8
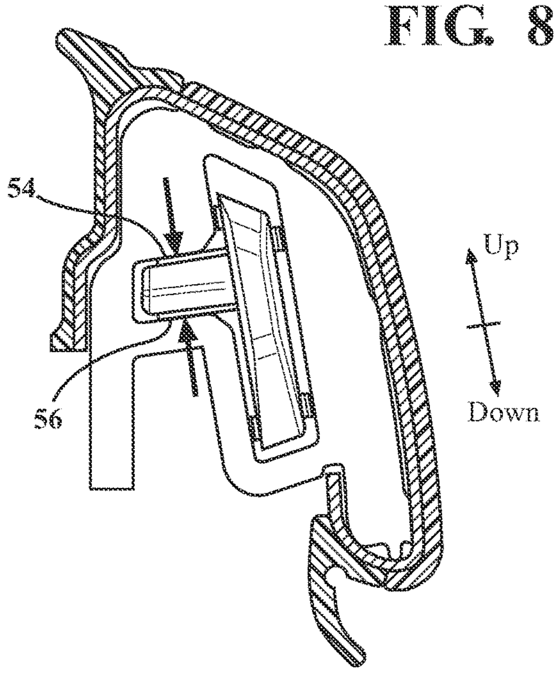
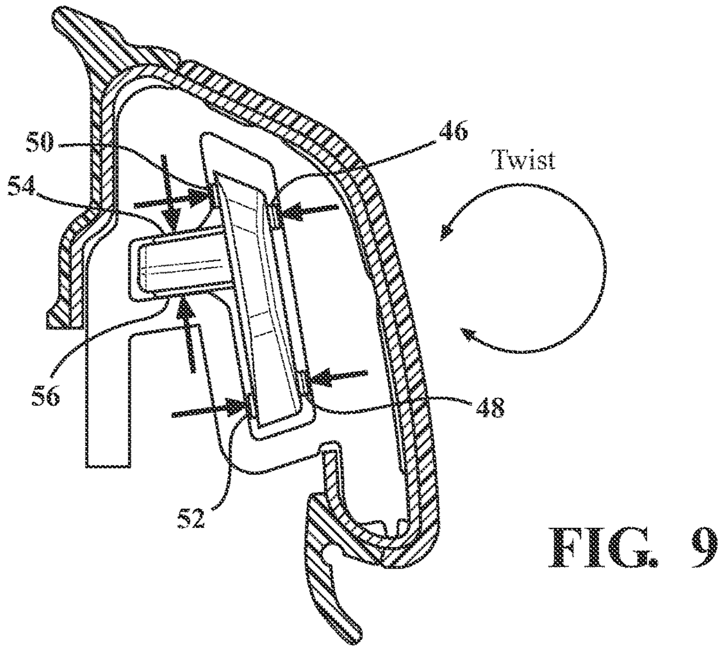
FIG. 9

T-BAYONET JOINT

CROSS-REFERENCE TO RELATED APPLICATIONS

This application is a National Stage of PCT International Patent Application No. PCT/US2021/036178, filed Jun. 7, 2021 and claims the benefit of U.S. Provisional Patent Application No. 63/062,864, filed Aug. 7, 2020. The disclosures of the above applications are incorporated herein by reference.

FIELD OF THE INVENTION

The present invention relates to joining of two pieces of vehicle trim and appliques using a connection assembly.

BACKGROUND OF THE INVENTION

In automotive assembly manufacturing tolerances and detail as to final fit on vehicles is very important. Elongated trim pieces are used to provide finished surfaces around windows and doors in vehicles. Pieces of trim may need to be butted end to end in some areas. These areas of connecting trim pieces are hard to align and maintain proper desired fit. Inconsistencies in joint fits based on variation in manufactured parts is a common problem in such assemblies.

Therefore, it is an objective in the art to provide a robust joint feature that is tunable and able to account for variation in assembly of trim and applique parts.

One way of providing a better joint is through tie plates. These form a robust joint that forces out of specification parts into place. However, this type of joint is costly due to adding an additional component to the joint system and fit can degrade over time.

Therefore, it is an objective in the art to provide a robust joint feature that is tunable and able to account for variation in assembly of trim and applique parts.

It is also a goal to provide a tunable connection that can be tuned during part manufacturing such that final assembly line tuning is reduced or eliminated.

SUMMARY OF THE INVENTION

A flange connector assembly for connecting trim pieces of a vehicle, wherein a first male portion having an end portion connected to a first trim part, and a second female portion connected to a trim part end to be attached to the first trim part. The first male portion has a connection portion with a T-shaped cross section and the second portion has a second connecting portion with a T-shaped cavity. The first male connecting portion and the second female connecting portion fit to precisely engage each other and retain the trim portion to be attached. The protruding T-shaped portion includes tuning surfaces and is capable of holding positioning up/down, inboard/outboard or twist fine tuning for providing alignment adjustment to the trim pieces.

The T-bayonet has a shape that allows for tunability in all directions to drive the joint to a nominal fit, but can be molded directly into the part, making it cost efficient.

The bayonet is designed to be in a T-shape, offering tuning surfaces for every direction, as well as twist.

A T-shaped hole in a receiver clip is used to pull a joining extruded part into place. This allows for the extrusion to be installed with a stab onto the bayonet, creating a desirable joint fit as the bayonet enters the receiver.

According to the process aspects of the present invention, a process for providing assembly tuning of a flange connector fit is provided. The steps include first providing a mold for making of a T-flange connector. The T-flange connector includes a first male portion having an end attached to an end of a first trim portion and a second female connection portion attached to an end of a second trim part to be attached to the first trim part. The first male portion has a connection portion with a T-shaped cross section and the second female portion has a second connecting portion with a T-shaped cavity wherein the first male portion and the second female connecting portion fit to precisely engage each other and retain the trim portion to be attached. The male portion includes tuning flange surfaces and is capable of holding positioning up/down, inboard/outboard or twist fine tuning for providing alignment adjustment to the trim pieces. The first male connector is fitted into the female connection flange and the connections are assessed for necessary fitment corrections. The fitment is corrected adjusting the height of the tuning flange surfaces by adding or subtracting materials in the molding surfaces of the mold to adjust the flange height. Thereafter, the male portion is remolded remolding one or more of the male portion connectors for providing a precision fit to a final tuned connection.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is an end view illustrating the rib tanning adjustments for inboard and outboard movement;

FIG. 8 is an end view illustrating the ribs requiring adjustment for up/down; and, FIG. 9 is an end view illustrating the ribs requiring adjustment for tuning for twist fitting of the pieces.

DETAILED DESCRIPTION OF THE PREFERRED EMBODIMENTS

Figure 1:
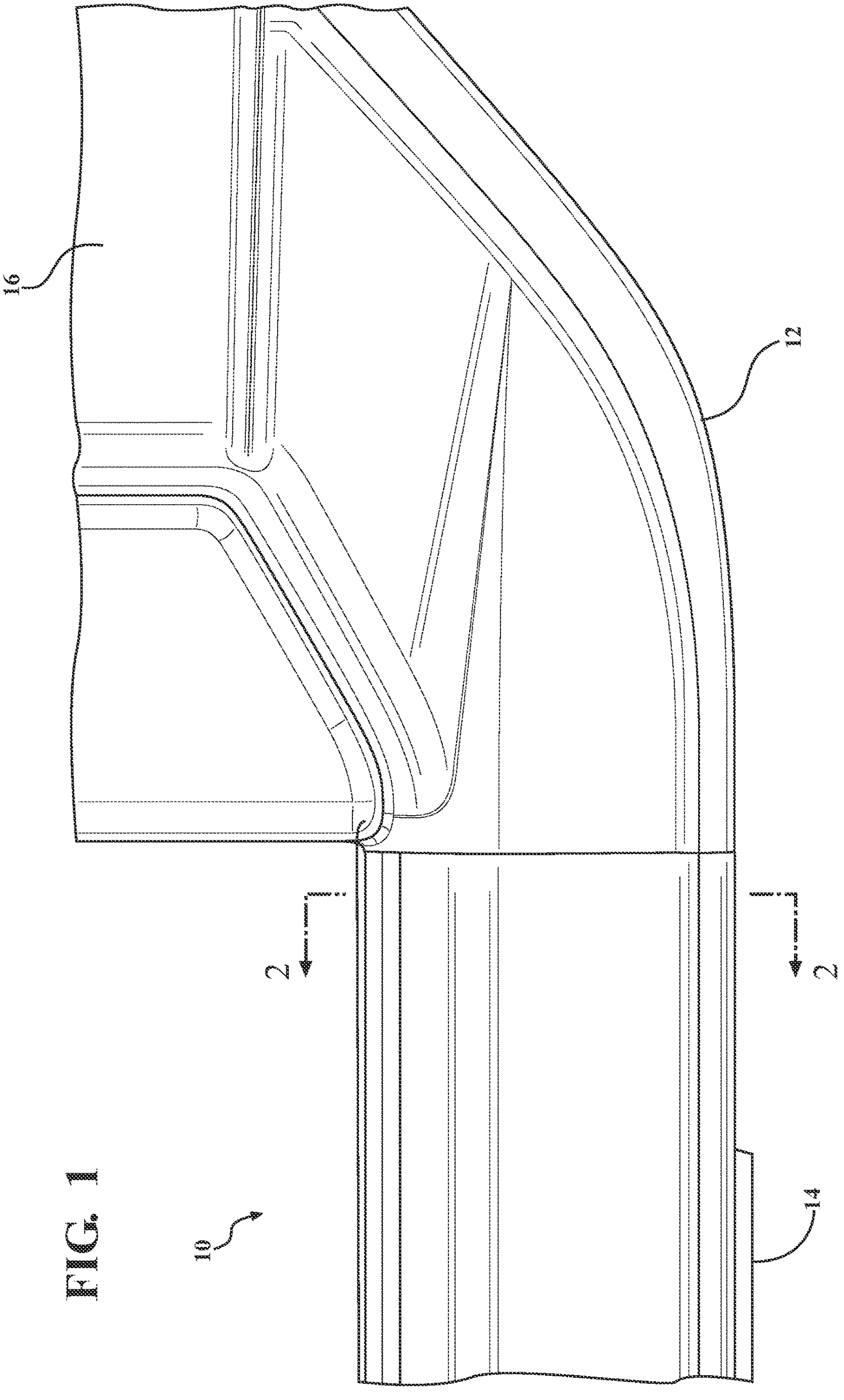
FIG. 1 is a plan view of a typical trim area in which a trim assembly connector is used.
Figure 2:
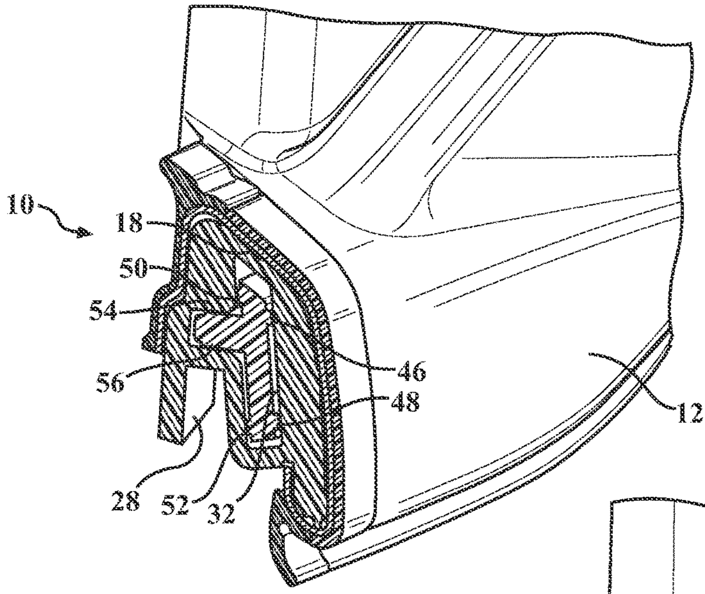
FIG. 2 is a sectional view of a trim assembly connector along the line 2-2 of FIG. 1.
Figure 3:
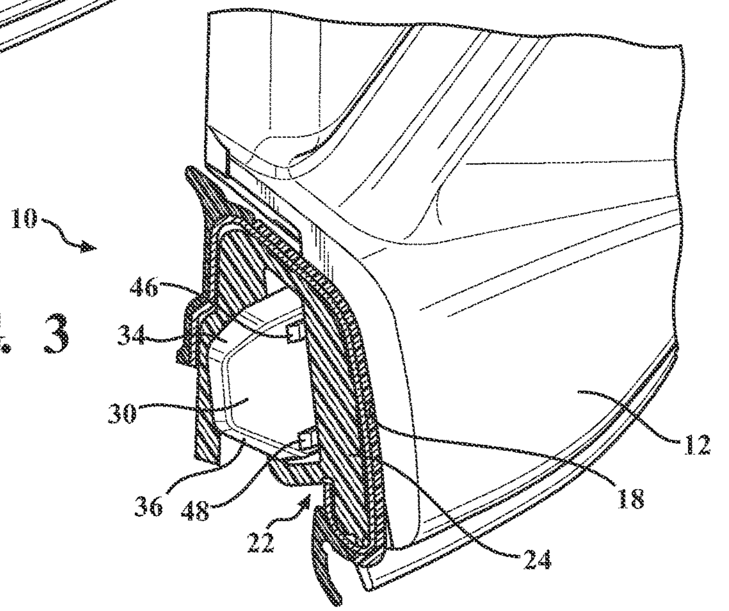
FIG. 3 is a perspective view showing the male side of the T-bayonet protrusion of the present invention.
Figure 4:
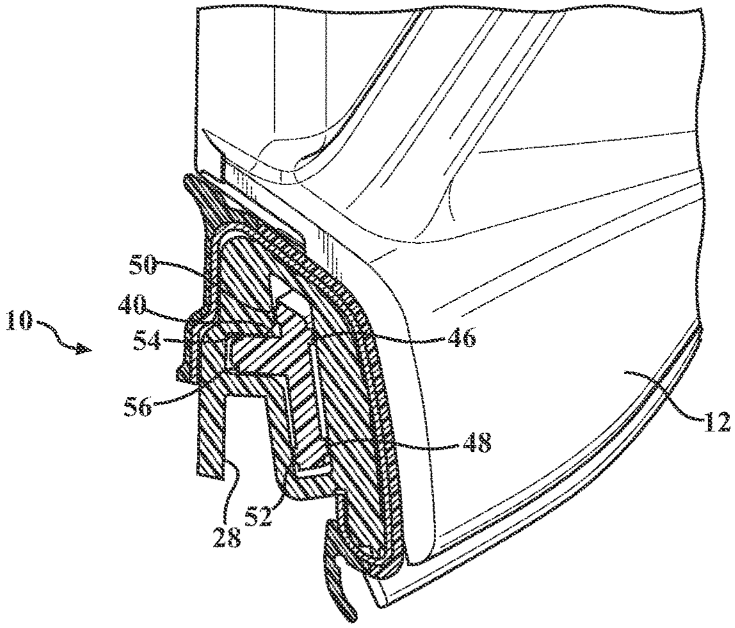
FIG. 4 is a perspective view of the T-bayonet with the female T-shaped connector in phantom illustrating engagement of the two connection portions.

The following description of the preferred embodiment(s) is merely exemplary in nature and is in no way intended to limit the invention, its application, or uses.

A flange connector assembly is shown generally at 10. The flange connector assembly 10 is for connecting trim pieces 12 and 14 of a vehicle 16. Each trim piece 12 and 14 have a longitudinal cavity 18 and 20 respectively.

The flange connector assembly 10 includes a first portion 22 having an end 24 fitting molded in place into cavity 18 on a first side and second portion 26 having an end 28 molded in place or fitting into a cavity 20 of a trim part 14 to be attached. The first portion 22 has a T-shaped cross section bayonet connecting portion 30 and the second portion 26 has a second female connecting portion 32. The first connecting portion 30 and the second connecting portion 32 provide alignment adjustment and hold their position in the adjusted position. In a preferred embodiment the male and female portions are molded in place during molding of the trim piece itself. This saves steps in assembly line of trying to hand fit each joint as it is assembled. With the present process a one-time change to the mold results in improved fit in the assembly line. Alternatively, if a metal shell type trim piece is used the male and female pieces can be inserted into the ends of the trim strip prior to assembly.

The first portion 22 has a male T-shaped protrusion 34 and the second portion 26 has a T-shaped slot 32 which accepts the T-shaped protrusion 30.

Figure 5:
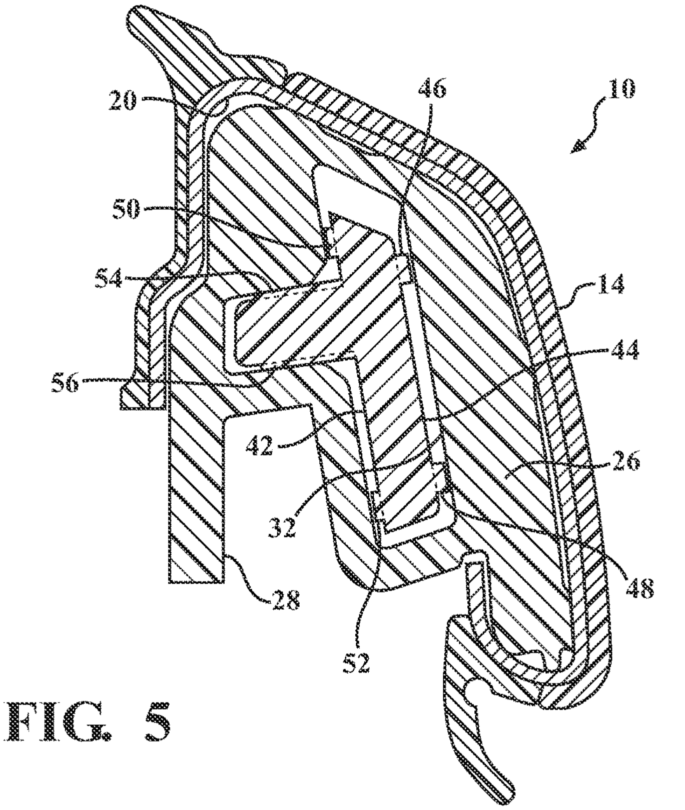
FIG. 5 is a sectional view showing the female section having a T-shaped cross section for receiving the T-bayonet portion.
Figure 6:
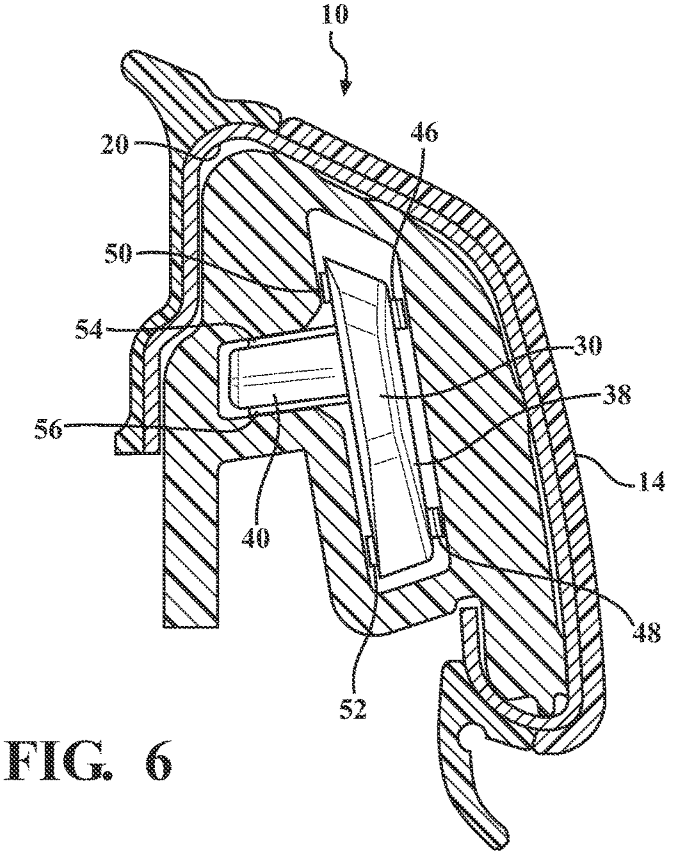
FIG. 6 is a sectional view showing the T-bayonet portion engaged in the female T-shaped opening.

Referring now to FIG. 5, the T-shaped protrusion 34 has ramped surfaces 34 and 36. The T-shaped protrusion has an elongated leg 38 and a second shorter leg 40. The leg 40 extends from the leg 38 offset along its length at an angle of about 90-degrees. The leg 38 has on its flat sides 42 and 44 a series of longitudinally extending contact ribs 46, 48, 50, and 52. The T-shaped portion itself in combination with contact ribs 46, 48, 50, and 52 are provided for adjustment and facial alignment of the trim pieces 12 and 14 during securement. Additionally, the shorter leg has tunable contact ribs 54 and 56 which allow up/down tunability to the design. At least one of the ribs is provide which extend 90-degrees to the elongated leg, Preferably, a plurality of ribs 54 and 56 are provided along the length of the second shorter leg 40. The T-bayonet connection assembly allows for tuning of the outer belt fit to the applique by the use of tuning ribs in the joint clip to allow up/down, inboard/outboard or twist fine tuning.

With respect to process aspects of the present invention for tuning the fitting and the tunability of the flanges. If the alignment of the two components need correction for better flushness The height of the rib features can be reduced or increased to induce a twist and/or translation in the direction to better align the two components. These ribs are easily "tuned" in the mold tool allowing for quick reaction times to improve fits. They are also aligned on the T-shaped bayonet to effectively tune in the directions which impact flushness in a direct manner.

Referring now to FIG. 7, if tuning is desired in the inboard or outboard direction the ribs 46, 48, 50 and 52 are adjusted higher or lower in the mold as needed for changing the final alignment.

Referring now to FIG. 8 if an up/down movement is needed to align the parts the height of the ribs 54 and 56 is adjusted in the mold. If a twisting is needed in alignment, then the height of all of the ribs is adjusted for the proper movement as seen in FIG. 9. Thus, a part is test fitted and the adjustments made and measured, the ribs are adjusted in the mold and parts are molded such that the final assembly is in alignment.

In operation with the next molding cycle where a rib(s) needs to be tuned, the mold cavity which defines these ribs has to be modified. The modification is done by machining or grinding the mold cavity at the very localized and defined areas of the rib. This can be easily and quickly be done as opposed to a bayonet feature without ribs. Without ribs the entire shape profile of a bayonet would have to be modified which could be more of an extensive modification to the mold cavity. The other important aspect of the ribs is that engineers can quickly file down the ribs and/or add tape shims to build up the ribs to determine the degree of change to tune-in the fit. Once dialed in, this part with shaved or built-up ribs can be measured for rib height changes and easily translated to changes needed in the mold cavity. In essence, the information back to the mold maker would be a single value for each rib to deepen or shorten. Without ribs a bayonet feature might require surface changes that are variable along its bearing surfaces. This can be difficult to measure the degree of change since it might vary in the section of the bayonet and hence be prone to a degree of error when modifying the mold. These joints require precision at the scale of 0.25 mm, so elimination of error is important and pertinent to making changes quickly.

This method is advantageous in that it takes the assembly line operator out of the picture in terms of effecting the flushness of the joint (good or bad). With this approach the rib heights are what controls the quality of the joint.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A flange connector assembly for connecting trim pieces of a vehicle each having a longitudinal cavity, the flange connector assembly comprising:

a first male portion having an end attached to an end of a first trim part and a second female portion attached to an end of a second trim part to be attached to the first trim part, said first male portion has a first connecting portion with a T-shaped cross section and the second female portion has a second connecting portion with a T-shaped cavity wherein the first male portion and the second female portion fit together and retain the second trim part, wherein the first male portion includes tuning surfaces and is capable of holding positioning up/down, inboard/outboard or twist fine tuning for providing alignment adjustment to the trim parts, wherein the first male portion has a first leg and a second leg attached to the first leg offset along its length to define the T-shaped cross section, and wherein the tuning surfaces include at least one rib provided on the first leg and oriented to engage the second trim part in the T-shaped cavity of the second connecting portion, and the tuning surfaces includes at least one rib provided on the second leg and oriented to engage the second trim part in the T-shaped cavity of the second connecting portion at a location spaced from the location of engagement between the at least one raised rib on the first leg and the second trim part.

2. The flange connector assembly of claim 1 wherein the first connecting portion has at least one ramped portion for assisting in locating during assembly.

3. The flange connector assembly of claim 1 wherein the at least one rib on the first leg includes at least one longitudinally extending rib on each of two opposite sides of the first leg, and the at least one rib on the second leg includes at least one laterally extending rib on each of two opposite sides of the second leg.

4. The flange connector assembly of claim 3 wherein the at least one longitudinally extending rib is positioned on a first flattened side of the first leg and at least one longitudinally extending rib is positioned on a second flattened side of the first leg facing the second leg.

5. The flange connector assembly of claim 4 wherein the at least one longitudinally extending rib that is positioned on the first flattened side includes a first rib located between a first end of the first leg and the location at which the second leg is attached to the first leg and a second rib located between a second end of the first leg and the location at which the second leg is attached to the first leg, and the at least one longitudinally extending rib that is positioned on the second flattened side includes a third rib located between the first end of the first leg and the location at which the second leg is attached to the first leg and a fourth rib located between the second end of the first leg and the location at which the second leg is attached to the first leg.

6. The flange connector assembly of claim 5 wherein the first connecting portion is made of a polymer material which will hold its set when tuning the connection between the parts.

7. The flange connector assembly of claim 3 wherein the first leg includes at least one rib between a first end of the first leg and the location at which the second leg is attached to the first leg, and the first leg includes at least one rib between a second end of the first leg and the location at which the second leg is attached to the first leg.

8. The flange connector assembly of claim 1 wherein the first connecting portion is made of a polymer material which will hold its set when tuning the connection between the parts.

9. The flange connector assembly of claim 1 wherein at least the first male portion is integrally molded in the end of the first trim part.

10. The flange connector assembly of claim 1 wherein at least the second female connecting portion is integrally molded with the second trim part.

11. The flange connector of claim 1 wherein the second leg extends longitudinally from the first leg and the at least one rib on the second leg extends laterally from the second leg, and the first leg extends laterally and the at least one rib on the first leg extends longitudinally from the first leg.

12. The flange connector of claim 11 wherein a plurality of laterally extending ribs is provided.

13. The flange connector of claim 11 wherein the at least one laterally extending rib extends outward on each side of the second leg.

14. A flange connector assembly for connecting trim pieces of a vehicle, the flange connector assembly comprising:

a first male portion of a first trim portion and a second female portion of a second trim part to be attached to the first trim part, said first male portion has a first connecting portion with a T-shaped cross section and the second female portion has a second connecting portion with a T-shaped cavity wherein the first male portion and the second female portion fit fit together and retain the second trim part, wherein the first connecting portion includes tuning surfaces engaged with the second connecting portion, wherein first connecting portion has a first leg and a second leg attached to said first leg between opposite ends of the first leg wherein the first leg extends laterally and said tuning surfaces include at least one longitudinally extending raised rib portion on the first leg and said second leg extends longitudinally and includes at least one laterally extending tuning flange.

15. The flange connector assembly of claim 14 wherein said first connecting portion has at least one ramped portion for assisting in locating the first connecting portion during assembly.

16. The flange connector assembly of claim 14 wherein the at least one laterally extending tuning flange includes laterally extending tuning flanges that extend outward on each side of the second leg.

17. The flange connector assembly of claim 16 wherein a plurality of laterally extending tuning flanges is provided on each side of the second leg.

18. A process for providing assembly tuning of a flange connector fit comprising the steps of:

a. providing a mold for making of a T-flange connector comprising a first male portion having an end attached to an end of a first trim part and a second female portion attached to an end of a second trim part to be attached to the first trim part, said first male portion has a connection portion with a T-shaped cross section and the second female portion has a second portion with a T-shaped cavity wherein the first male portion and the second female connecting portion fit to precisely engage each other and retain the trim portion to be attached wherein the male portion includes tuning flange surfaces which are capable of holding positioning up/down, inboard/outboard or twist fine tuning in a final assembly; and, b. fitting the first male portion into the second female portion and correcting any necessary up/down, inboard/outboard or twist type fitting issues by adjusting the height of the tuning flange surfaces in the mold and remolding one or more of the male portion connectors for providing a precision fit to a final tuned connection.

19. The process of claim 18 wherein the tuning flange surfaces further comprise at least one elongated flange extending outwardly from the surface of the male portion.

20. The process of claim 19 wherein the male portion has a first leg and a second leg extending from the first leg in substantially a 90-degree angle, wherein an elongated flange is provided extending 90-degrees from either side of the first leg in a longitudinal direction and at least one laterally extending flange is provided on either side of the second leg.

21. The process of claim 20 wherein there is at least one pair of longitudinally extending elongated flanges on either side of the first leg on each side of the first leg, on each side of a location where the second leg connects to the first leg.

22. The process of claim 21 wherein the height of the flanges is adjusted for fine tuning and adjusting the fit.

* * * * *